United States Patent [19]

Inukai et al.

[11] Patent Number: 5,435,334
[45] Date of Patent: Jul. 25, 1995

[54] HYDRAULIC CIRCUIT

[75] Inventors: Seiichi Inukai, Kyoto; Kenjiro Fujita, Kusatsu; Akihiro Kondo, Kyoto; Yasuhiko Fujita, Moriyama, all of Japan

[73] Assignee: Mitsubishi Jidosha Kogyo Kabushiki Kaisha, Tokyo, Japan

[21] Appl. No.: 162,630

[22] Filed: Dec. 7, 1993

[30] Foreign Application Priority Data

Dec. 16, 1992 [JP] Japan .................................. 4-336411

[51] Int. Cl.⁶ .......................................... G05D 16/10
[52] U.S. Cl. .................................. 137/115; 137/545
[58] Field of Search ............................ 137/115, 545

[56] References Cited

U.S. PATENT DOCUMENTS

| | | | |
|---|---|---|---|
| 3,329,194 | 7/1967 | Miliacca | 137/545 X |
| 3,699,994 | 10/1972 | Mohri | 137/115 |
| 4,625,749 | 12/1986 | Eskildsen | 137/115 |
| 5,215,444 | 6/1993 | Bishoff | 137/115 X |

*Primary Examiner*—Stephen M. Hepperle
*Attorney, Agent, or Firm*—Evenson, McKeown, Edwards & Lenahan

[57] ABSTRACT

A bypass line is provided to return an excess portion of working oil, whose pressure has been regulated by a regulator valve, to a suction side of an oil pump from a point between the regulator valve and a torque converter pressure regulator valve. An oil filter is inserted in the bypass line.

12 Claims, 3 Drawing Sheets

HYDRAULIC CIRCUIT

BACKGROUND OF THE INVENTION

1) Field of the Invention

This invention relates to a hydraulic circuit suitable for use with an automatic transmission.

2) Description of the Related Art

FIGS. 5 and 6 are circuit diagrams showing two examples of an oil-pump-containing section of a hydraulic circuit for an automatic transmission. FIG. 4 is a schematic side view illustrating one example of such an automatic transmission.

According to the hydraulic circuit shown in FIG. 5, working oil in an oil pan 1 is sucked up by an oil pump 3 via an oil filter 2 arranged in a housing 11 of an automatic transmission 10. After the working oil is allowed to flow through a regulator valve 4, the working oil is divided into two portions, one being to be used as a line pressure and the other to be delivered to a torque converter and a lubricating circuit via a torque converter pressure regulator valve 5 which may hereinafter be called the "TC pressure regulator valve 5" as needed. Further, any excess portion of the working oil fed to the regulator valve 4 is returned to a suction side of the oil pump 3.

Further, a further portion of the working oil, said further portion having been divided from a delivery side of the oil pump 3, is fed to various control valves of the automatic transmission by way of an external oil filter 6 mounted on an outer wall of the housing 11 of the automatic transmission 10 (see FIG. 4).

According to the hydraulic circuit depicted in FIG. 6, working oil in the oil pan 1 is sucked up by the oil pump 3 via the oil filter 2 arranged in the housing 11 of the automatic transmission 10. After the working oil is allowed to flow through the regulator valve 4, the working oil is divided into two portions, one being to be used as a line pressure and the other to be delivered to the torque converter pressure regulator valve 5. The working oil which has flowed through the torque converter pressure regulator valve 5 is delivered via a cooler 7 to the external oil filter 6 and further to a torque converter 8.

The hydraulic circuit of FIG. 6 is also designed to have any excess portion of the working oil, which has been delivered to the regulator valve 4, returned to the suction side of the oil pump 3.

The oil filter 2, which is arranged on the suction side of the oil pump 3 and is accommodated within the housing 11 of the automatic transmission 10, is to remove solid particles from the working oil in the hydraulic circuit. The oil filter 2 makes use of a filter medium having relatively large pores because unduly small pores lead to a greater loss of the oil pump 3.

If the pores of the filter medium of the oil filter 2 are excessively large, however, the working oil delivered from the oil pump 3 still contains solid particles which may impair proper and smooth operation of each valve. As a result, it may become no longer possible to ensure the supply of the working oil in quantities as needed.

To overcome such a potential problem, the external oil filter 6 is arranged in addition to the oil filter 2 disposed inside the automatic transmission 10 so that the service life of the working oil of the automatic transmission can be prolonged and the maintenance of the automatic transmission can be facilitated.

In the hydraulic circuit of FIG. 5, the external oil filter 6 provided internally with a filter medium having smaller pores than the filter medium of the oil filter 2 is arranged on a delivery side of the pump 3 in addition to the oil filter 2, whereby the working oil from which solid particles have been additionally filtered off is supplied to the individual control valves.

According to the hydraulic circuit of FIG. 6, on the other hand, the working oil fed via the TC pressure regulator valve 5 is allowed to flow through the external oil filter 6 which is internally provided with a filter medium having smaller pores. Solid particles are hence filtered off further from the working oil. The working oil is then fed to the torque converter 8.

Incidentally, the working oil fed from the oil pump 3 to the regulator valve 4 is released to the outside when the quantity of the working oil becomes greater than that required for the regulator valve 4. The working oil so released is returned to the suction side of the oil pump 3 in both the hydraulic circuits of FIGS. 5 and 6.

The hydraulic circuit shown in each of FIGS. 5 and 6 must however be designed in such a way that, if the external filter is clogged, a relief valve provided in combination with the external oil filter is operated to feed the working oil to a downstream side. Further, the hydraulic circuit of FIG. 5 is accompanied by the problem that load to the oil pump is increased by the flow resistance of the external oil filter.

SUMMARY OF THE INVENTION

With the foregoing in view, the present invention has as a primary object the provision of such a hydraulic circuit that working oil having a low degree of contamination can be fed to various portions without increasing load to an oil pump by arranging a second oil filter in a bypass circuit through which any excess portion of the working oil regulated in pressure by pressure regulator means is allowed to flow back to a suction side of the oil pump.

In one aspect of the present invention, there is thus provided a hydraulic circuit suitable for use with an automatic transmission of a vehicle, said hydraulic circuit having an oil pump, a first oil filter arranged on a suction side of said oil pump, a second oil filter provided with a filter medium having smaller pores than said first oil filter, an oil reservoir for storing working oil therein, regulator means for regulating the pressure of the working oil sucked up by said oil pump from said oil reservoir via said first oil filter, said regulator means being arranged on a delivery side of said oil pump, and an excess oil line connected to the regulator means for guiding excess working oil from said regulator means to a hydraulically actuated device, characterized in that said hydraulic circuit further comprises a bypass oil line connected to an intermediate point of said excess oil line to return at least a portion of the excess oil to a point between said oil pump and said first oil filter; and said second oil filter is arranged at an intermediate point of said bypass oil line.

In the hydraulic circuit according to the one aspect of the present invention, the second oil filter is arranged in the bypass line of the oil pump, through which bypass line any excess portion of the oil regulated in pressure by the regulator means is returned to the suction side of the oil pump. It is therefore possible to feed oil with a low degree of contamination to various portions without applying extra load to the oil pump despite the arrangement of the second oil filter.

In another aspect of the present invention, there is also provided a hydraulic circuit having an oil pump, a first oil filter arranged on a suction side of said oil pump, an oil reservoir for storing oil therein, regulator means for regulating the pressure of the oil sucked up by said oil pump from said oil reservoir via said first oil filter, said regulator means being arranged on a delivery side of said oil pump, and an oil return line for returning oil from said regulator means to a point between said oil pump and said first oil filter, characterized in that a second oil filter is arranged in said oil return line at an intermediate portion thereof.

In the hydraulic circuit according to the another aspect of the present invention, a continued operation can promote decontamination of the oil so that high-speed sliding portions lubricated by the oil are protected from damages.

BRIEF DESCRIPTION OF THE DRAWINGS

The above and other objects, features and advantages of the present invention will become apparent from the following description and the appended claims, taken in conjunction with the accompanying drawings in which:

DETAILED DESCRIPTION OF THE INVENTION AND PREFERRED EMBODIMENTS

The hydraulic circuit according to the first embodiment of the present invention will hereinafter be described with reference to FIGS. 1 and 2, in which the numerals commonly used in FIGS. 3 through 5 indicate substantially the same elements.

Figure 1:
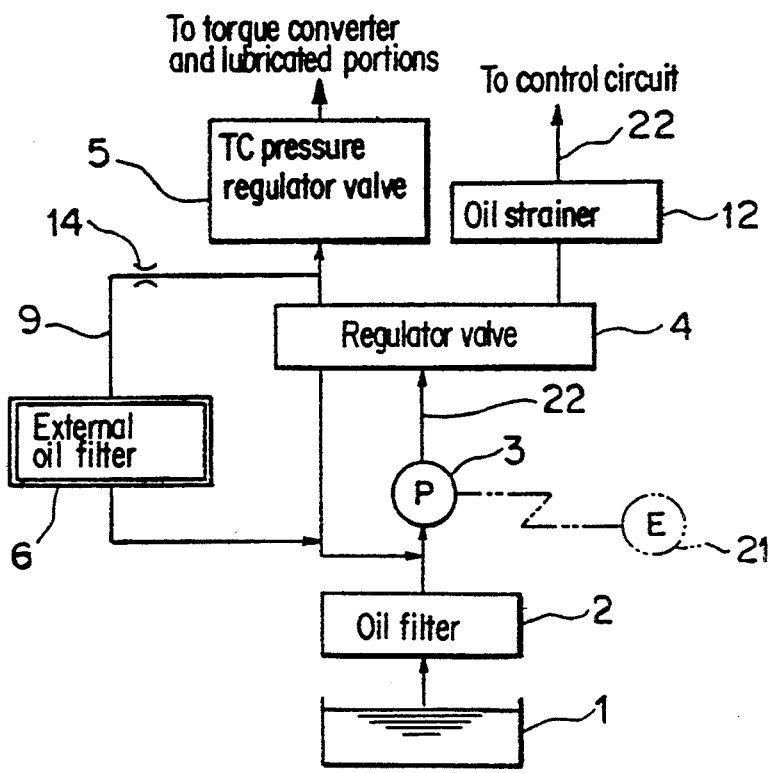
FIG. 1 is a simplified circuit diagram of a hydraulic circuit according to a first embodiment of the present invention, which is suitable for use with an automatic transmission.
Figure 2:
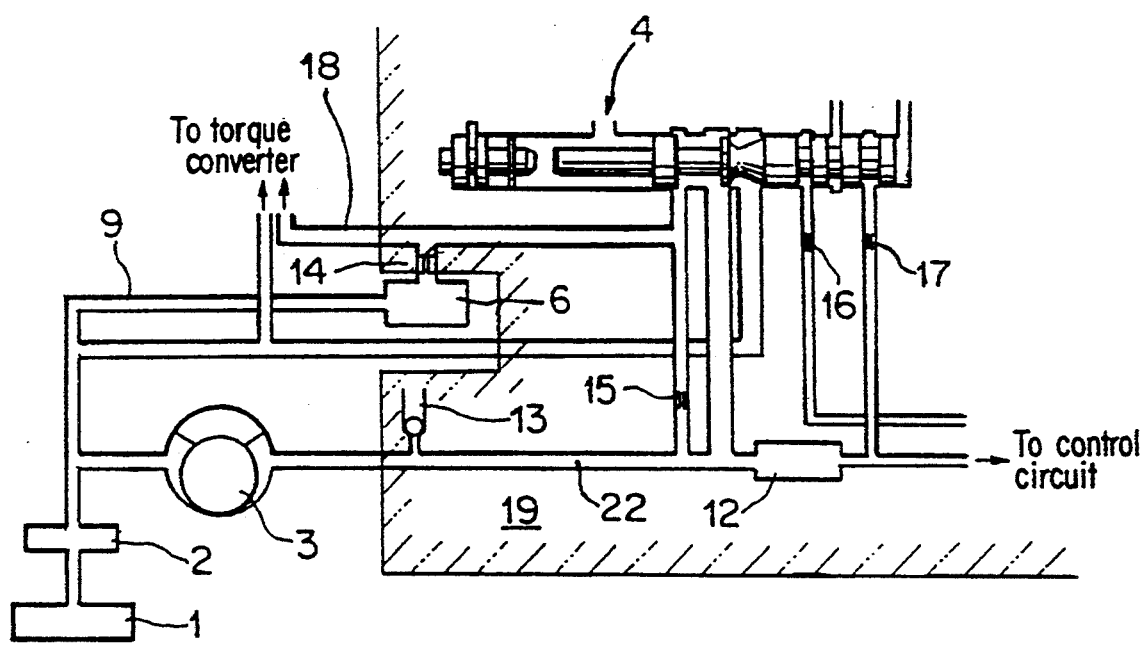
FIG. 2 is a circuit construction diagram of the hydraulic circuit of FIG. 1.
Figure 4:
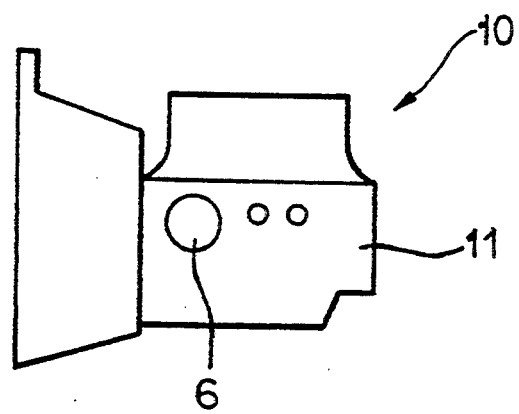
FIG. 4 is a schematic side view showing one example of an automatic transmission having a second oil filter.
Figure 5:
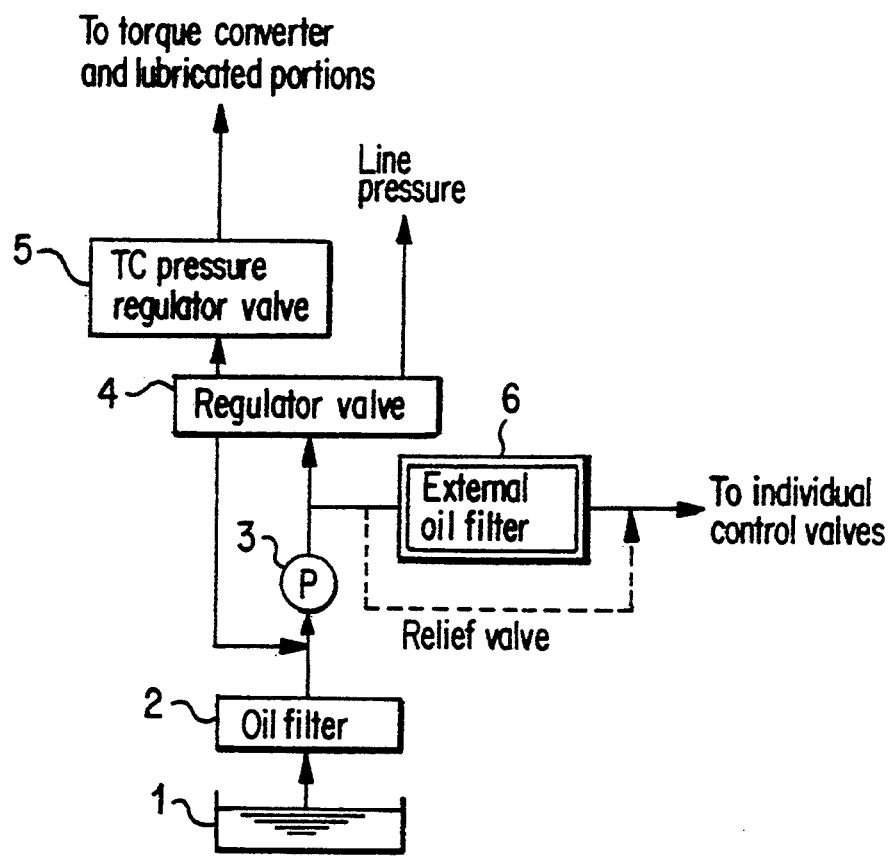
FIG. 5 is a circuit diagram of a hydraulic circuit according to one example, which is suitable for use with an automatic transmission.
Figure 6:
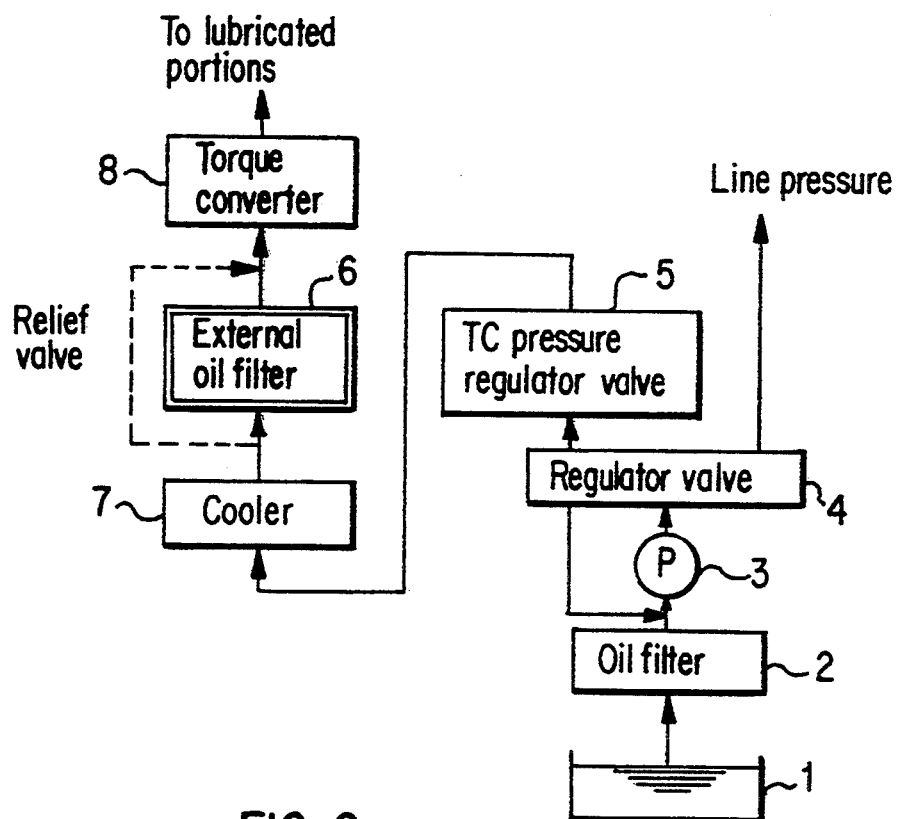
FIG. 6 is a circuit diagram of a hydraulic circuit according to another example, which is suitable for use with an automatic transmission.

In FIGS. 1 and 2, working oil in an oil pan 1 is sucked up by an oil pump 3, which is driven by an output of an engine 21, via a first oil filter 2 arranged in a housing 11 of an automatic transmission 10 (see FIG. 4). After the working oil is allowed to flow through a regulator valve 4, the working oil is divided into two portions, one being to be delivered as a line pressure to a control circuit through a line pressure delivery line 22 and the other to be delivered to a torque converter and a lubricating circuit via a torque converter pressure regulator valve 5 which may hereinafter referred to as the "TC pressure regulator valve 5". The construction of the above circuit is the same as that illustrated in FIG. 5.

Between the regulator valve 4 and the TC pressure regulator valve 5, an excess oil line 18 is disposed. A portion of excess working oil from the regulator valve 4 is branched out through a bypass line 9 connected to the excess oil line 18. This excess working oil is divided, as needed, into two portions, one being to be fed to the torque converter and the other to be guided to a suction-side line of the oil pump 3 at a point downstream of the first oil filter 2. In addition to the first oil filter 2 arranged inside the automatic transmission 10, a second oil filter 6 provided internally with a filter medium having smaller pores than a filter medium of the first oil filter 2 is inserted in the bypass line 9. The second oil filter 2 is replaceably mounted on an outer wall of the housing 11 at an appropriate position thereof (see FIG. 4).

In the illustrated first embodiment, the regulator valve 4 is designed to release, as excess oil, an extra portion of working oil beyond necessity when the rotation of an engine exceeds, for example, 1,000 rpm.

By guiding the excess oil to the bypass line 9 and returning it to the suction side of the oil pump 3 via the second oil filter 6 provided with the filter medium having the smaller pores, more excess oil is recirculated from the regulator valve 4 to the main line as the rotation of the engine increases, while solid particles are additionally removed therefrom. As the operation continues, working oil having a progressively lowering degree of contamination is supplied to various portions.

Incidentally, designated at numeral 12 in FIG. 2 is an oil strainer arranged in the line pressure delivery line 22 on a line pressure delivery side of the regulator valve 4. This oil strainer 12 will hereinafter be described in brief.

Production of chips is unavoidable when the oil pump 3 is assembled and accommodated inside the housing 11. When the engine is started with such chips remaining on the delivery side of the oil pump 3, solid particles mixed in the working oil inside the oil pan 1 are removed by the oil filters 2,6 but the chips produced upon the assembly are caused to enter a valve body 19 in which the regulator valve 4 and the respective lines are accommodated or formed. These chips may therefore become a cause for valve sticking.

To prevent such inconvenience, the oil strainer 12 is arranged on the line pressure delivery side of the regulator valve 4. The strainer 12 is provided with a filter medium having greater pores than the first oil filter 2. Despite its ability to remove such chips, the strainer 12 is therefore resistant to clogging so that the strainer 12 can sufficiently transmit the line pressure therethrough.

Numeral 13 designates a relief valve arranged on the delivery side of the oil pump 3, while numerals 14 to 17 indicate orifices, respectively. The orifice 14 is arranged on an upstream side of the second oil filter 6 to ensure the delivery of working oil in sufficient quantities to the torque converter and the lubrication system.

Owing to the construction described above, the hydraulic circuit according to the present invention makes it possible to recirculate and feed the working oil having a lower degree of contamination to the second oil filter 6 as the operation of the engine continues. Moreover, the second oil filter 6 provided with the filter medium having the smaller pores is disposed in the bypass line 9 and filters an excess portion of the working oil subsequent to its pressure regulation by the regulator valve 4. The load to the oil pump 3 is therefore not increased.

The second oil filter 6 has the potential problem that it may be clogged, resulting in an increase in flow resistance and hence in a decrease in flow rate. Nevertheless, it is unnecessary to provide any additional relief valve because the second oil filter 6 is arranged in the bypass line 9 for any excess oil.

It should be noted that the present invention is not limited to hydraulic circuits for automatic transmissions. The present invention can also be applied, in a similar manner to the above-described first embodiment, to the engine lubrication circuit shown as the second embodiment in FIG. 3, in which elements similar to those described above in connection with the first embodiment are indicated by like numerals. Description of such similar elements are omitted herein.

Figure 3:
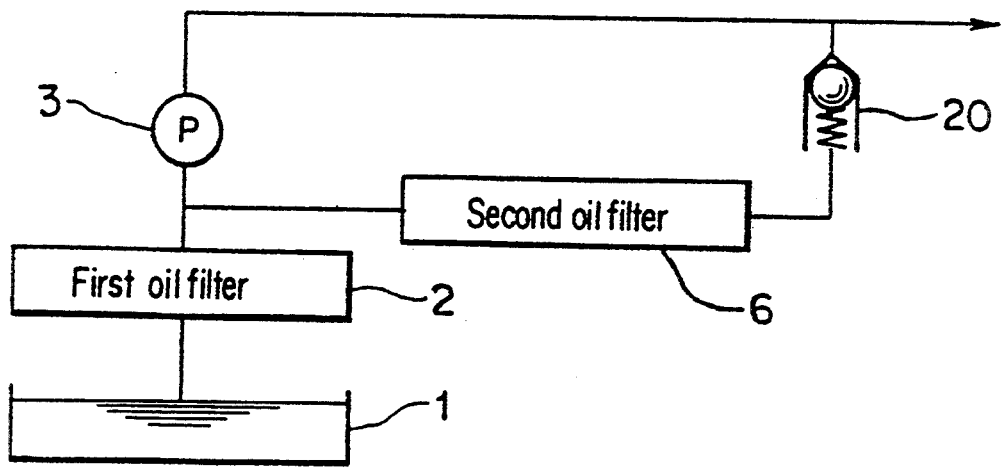
FIG. 3 is a simplified circuit diagram of an engine lubrication circuit according to a second embodiment of the present invention.

Referring now to FIG. 3, the engine lubrication circuit will be described in brief. Designated at numeral 20 is a relief valve. When the delivery pressure of the oil pump 3, namely, the hydraulic pressure supplied to a lubricated portion has increased to at least a predetermined value, the relief valve 20 opens. Accordingly the relief valve 20 has pressure regulating function to stabilize a hydraulic pressure to be supplied. A delivery pressure from the relief valve 20 is returned through an oil return line to a point between a first oil filter 2 and an oil pump 3. A second oil filter 6 is inserted at an intermediate point of the oil return line. The second oil filter 6 is provided with a filter medium having smaller pores than the first oil filter 2. According to this construction, oil is filtered further whenever the relief value 20 opens so that a continued operation makes it possible to lubricate with more purified oil. As a consequence, the hydraulic circuit according to the second embodiment can achieve more efficient protection of high-speed sliding portions such as a cam shaft, pistons and liners (not shown) from damages.

What is claimed is:

1. A hydraulic circuit suitable for use with an automatic transmission of a vehicle, comprising:
    an oil pump;
    a first oil filter arranged on a suction side of said oil pump;
    a second oil filter provided with a filter medium having smaller pores than said first oil filter;
    an oil reservoir for storing working oil therein;
    regulator means for regulating the pressure of the working oil sucked up by said oil pump from said oil reservoir via said first oil filter, said regulator means being arranged on a delivery side of said oil pump;
    an excess oil line connected to said regulator means for guiding excess working oil from said regulator means to a hydraulically actuated device; and
    a bypass oil line connected to an intermediate point of said excess oil line to return at least a portion of the excess oil to a point between said oil pump and said first oil filter;
    wherein said second oil filter is arranged at an intermediate point of said bypass oil line.

2. A hydraulic circuit of claim 1, wherein an orifice is arranged on an upstream side of said second oil filter.

3. A hydraulic circuit of claim 1, wherein said hydraulic circuit further comprises a line pressure delivery line connected to said regulator means for guiding a line pressure, which has been regulated by said regulator means, to another hydraulically actuated device, a third oil filter arranged in said line pressure delivery line, and a valve body; and said valve body accommodates at least said regulator means, said excess oil line, said line pressure delivery line, said third oil filter and said bypass oil line.

4. A hydraulic circuit of claim 3, wherein said third oil filter is provided with a filter medium having greater pores than said first oil filter.

5. A hydraulic circuit of claim 1, wherein said hydraulic circuit further comprises an orifice arranged on an upstream side of said second oil filter, a line pressure delivery line connected to said regulator means for guiding a line pressure, which has been regulated by said regulator means, to another hydraulically actuated device, a third oil filter arranged in said line pressure delivery line, and a valve body; and said valve body accommodates at least said regulator means, said excess oil line, said orifice, said line pressure delivery line, said third oil filter and said bypass oil line.

6. A hydraulic circuit of claim 5, wherein said third oil filter is provided with a filter medium having greater pores than said first oil filter.

7. A hydraulic circuit of claim 1, wherein said hydraulically actuated device is a torque converter disposed between said automatic transmission and an engine of said vehicle.

8. A hydraulic circuit of claim 1, wherein said second oil filter is replaceably mounted on an outer wall of a housing of said automatic transmission.

9. A hydraulic circuit of claim 1, wherein said second oil filter is replaceably mounted on an outer wall of a housing of said automatic transmission; said hydraulic circuit further comprises a line pressure delivery line connected to said regulator means for guiding a line pressure, which has been regulated by said regulator means, to another hydraulically actuated device, a third oil filter arranged in said line pressure delivery line, and a valve body; and said valve body accommodates at least said regulator means, said excess oil line, said line pressure delivery line, said third oil filter and said bypass oil line.

10. A hydraulic circuit of claim 1, wherein said second oil filter is replaceably mounted on an outer wall of a housing of said automatic transmission; said hydraulic circuit further comprises an orifice arranged on an upstream side of said second oil filter, a line pressure delivery line connected to said regulator means for guiding a line pressure, which has been regulated by said regulator means, to another hydraulically actuated device, a third oil filter arranged in said line pressure delivery line and provided with a filter medium having greater pores than said first oil filter, and a valve body; and said valve body accommodates at least said regulator means, said excess oil line, said orifice, said line pressure delivery line, said third oil filter and said bypass oil line.

11. A hydraulic circuit comprising:
    an oil pump;
    a first oil filter arranged on a suction side of said oil pump;
    an oil reservoir for storing oil therein;
    a pressure regulator configured to regulate the pressure of the oil sucked up by said oil pump from said oil reservoir via said first oil filter and arranged on a delivery side of said oil pump;
    an oil return line for returning oil from said pressure regulator to a point between said oil pump and said first oil filter; and
    a second oil filter arranged in said oil return line at an intermediate portion thereof.

12. A hydraulic circuit of claim 11, wherein said regulator means is a relief valve which opens when the delivery pressure of said oil pump has increased to at least a predetermined value.

* * * * *